(No Model.)
S. CAMPBELL.
DISK PLOW.
No. 553,510.            Patented Jan. 28, 1896.
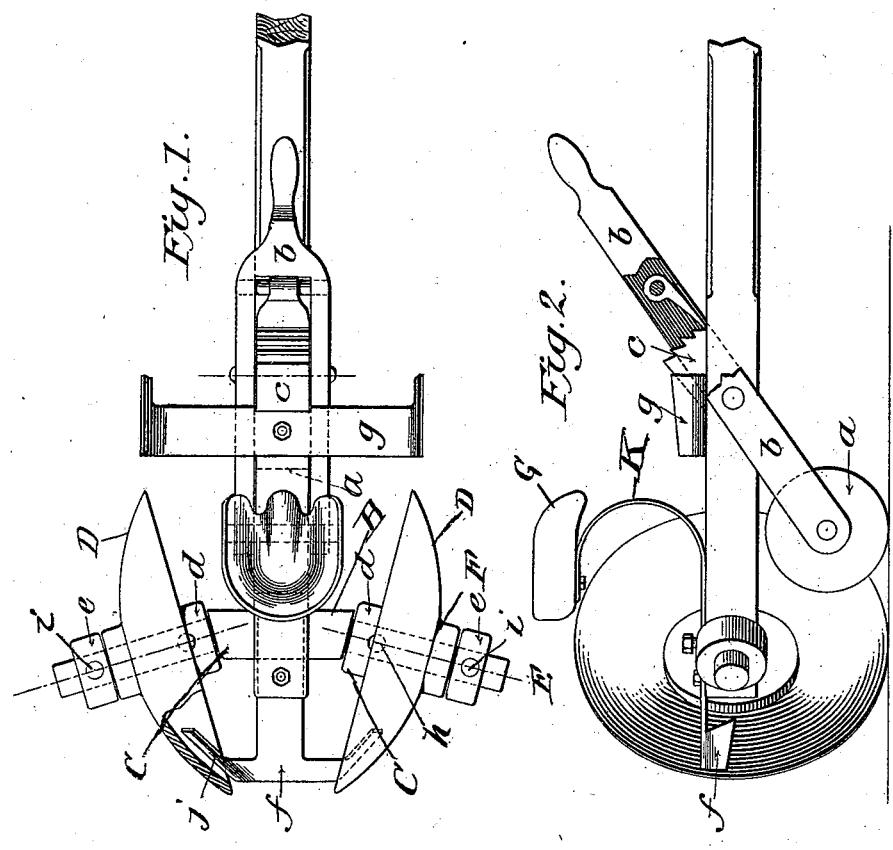
Witnesses:
Jas. A. McKibbin
A. R. Bennick.
Inventor.
Singleton Campbell

UNITED STATES PATENT OFFICE.

SINGLETON CAMPBELL, OF NEW WAVERLY, TEXAS.

DISK PLOW.

SPECIFICATION forming part of Letters Patent No. 553,510, dated January 28, 1896.

Application filed October 2, 1894. Serial No. 524,702. (No model.)

*To all whom it may concern:*

Be it known that I, SINGLETON CAMPBELL, a citizen of the United States, residing at New Waverly, Walker county, Texas, have invented a new and useful Improvement in Disk Plows, of which the following is a specification.

My invention relates to that class of plows known as "revolving" or "disk" plows in which a disk or disks turn and pulverize the soil somewhat after the manner of a moldboard-plow.

Prominent objects and advantages of my invention are that I provide an implement which can be advantageously employed in plowing or preparing lands for the growing of cotton and other crops, and also cultivating between or straddling the rows of growing crops by throwing to or from the rows.

The particular features and details of my invention are more particularly hereinafter described in connection with the accompanying drawings, in which—

Figure 1 is a top plan view of my device partially in section; and Fig. 2 is a side elevation thereof with one disk removed therefrom, also partially in section to more clearly show certain details of construction.

Referring to the drawings, the letter A designates the tongue of the implement, to the rear end of which is attached a short transverse beam B, the ends of which are provided with beveled or inclined ends C to cause the plows D to set at an angle to the line of draft. To these outer beveled ends are formed or attached spindles E upon which are mounted said plows. The plows D are concavo-convex disks riveted or otherwise secured to metal hubs F, said hubs being held in place on the spindles or axles by collars $d$, which serve also as sand bands, these collars or bands being secured to axle by set-screws. To the outer ends of the spindles are placed retaining-washers $e$, also held in place by set-screws.

To the rear end of the tongue is secured a rearwardly-extending arm $f$, provided at its free end with two scrapers $j$, which project outwardly and forwardly, the free ends of which conform to the concave sides of the disks.

Mounted upon the tongue at the cross-bar B is a seat-standard K, which supports a seat G for the operator. At a suitable distance from the seat is placed a foot-rest $g$. Forward of the foot-rest and in convenient reach of the operator is arranged a gage-wheel $a$. This gage-wheel is mounted between the lower bifurcated ends of an operating-lever $b$. The bifurcated ends of the lever $b$ embrace the tongue and are pivoted thereto at about midway their length, and its upper end is reduced to form a hand-grip for operating the same. A locking device of ordinary construction is secured to the tongue and lever.

In operation the driver mounts the seat and adjusts the lever and gage-wheel to cause the plows to penetrate to the desired depth. The wheel being located just forward of the plows serves to counterbalance the tongue and relieve the horses' necks.

In the forward progress of the machine the plows turn the furrows, throwing the soil inward and thoroughly pulverizing the same. The scrapers keep the plows from clogging or fouling.

If it is desired to throw the soil outward, the cross-bar B is unbolted and the bar turned so that its spindle ends will project forward and then rebolted to the beam.

The machine is simple in construction, easy to manipulate and repair, and owing to the reduction in parts over plows of this class is greatly cheapened in its cost of production.

Having fully described my invention, what I claim as new, and desire to secure by Letters Patent, is—

A revolving or disk-plow consisting of a tongue, a cross-bar with beveled ends, spindles on said ends at an angle to said cross-bar; disks mounted on said spindles, a double scraper for the disks; a gage-wheel mounted between the bifurcated ends of a lever and said lever embracing the tongue and pivoted thereto and a locking device for said lever, substantially as described.

SINGLETON CAMPBELL.

Witnesses:
JAS. A. MCKIBBIN,
A. R. BENNICK.